March 6, 1928.  O. WITTEL  1,661,743
MOTION PICTURE PROJECTOR
Filed Feb. 20, 1925   2 Sheets-Sheet 1
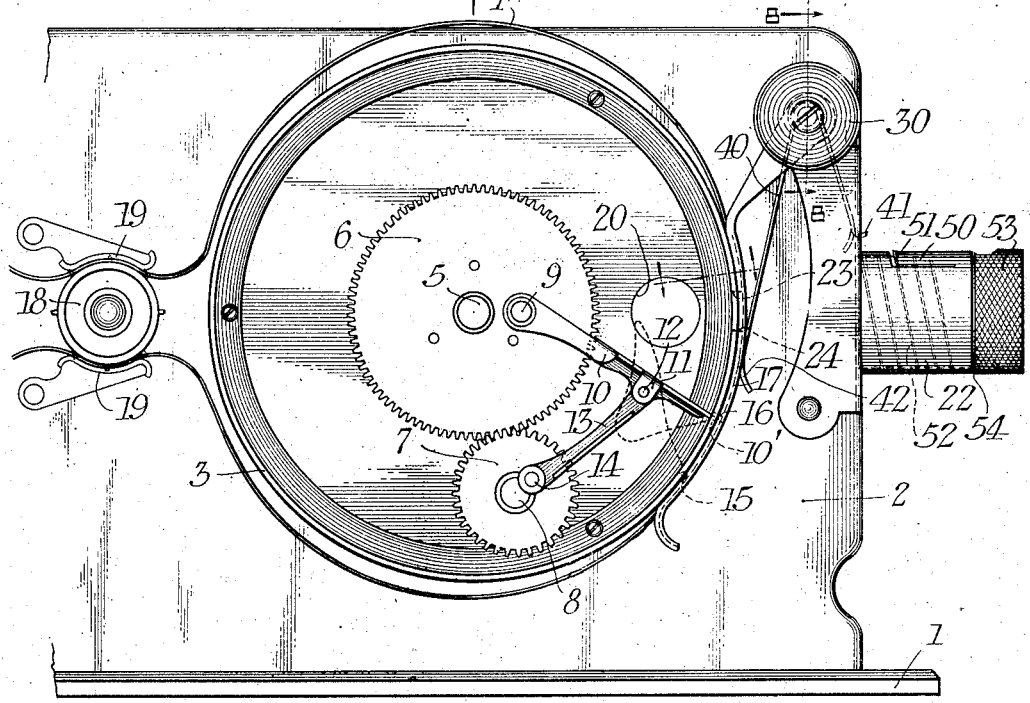
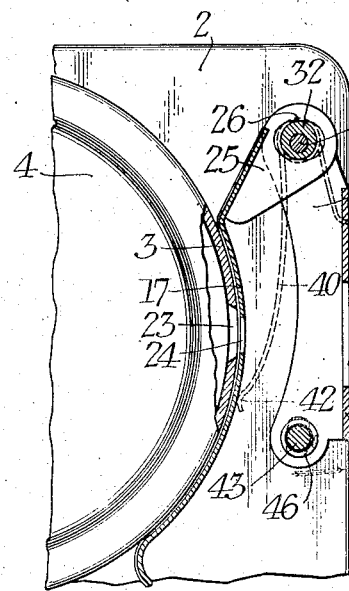
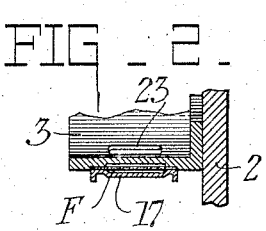
Otto Wittel,
INVENTOR,
BY R. L. Stuchfield
N. M. Pennie
ATTORNEYS.

March 6, 1928. 1,661,743
O. WITTEL
MOTION PICTURE PROJECTOR
Filed Feb. 20, 1925    2 Sheets-Sheet 2
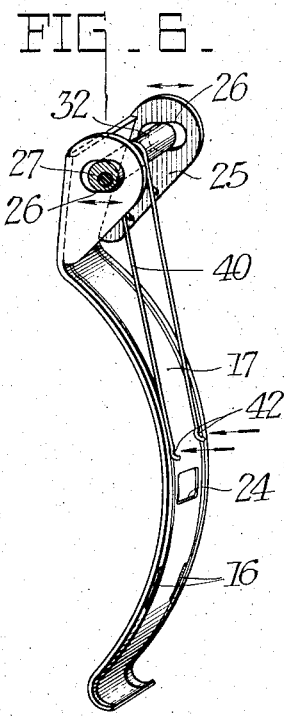
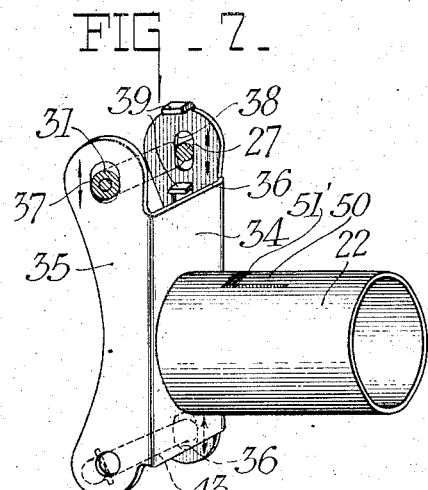
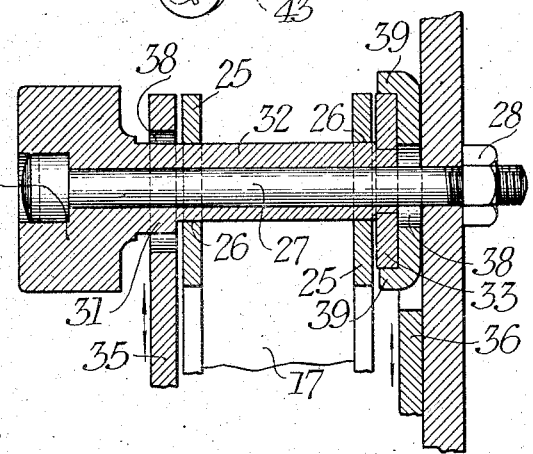
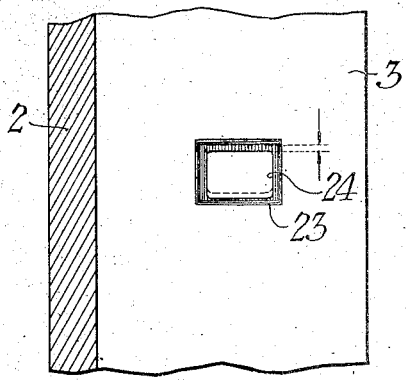
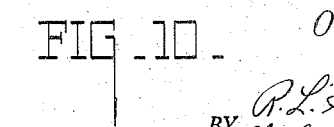
Otto Wittel,
INVENTOR,
BY
ATTORNEYS.

Patented Mar. 6, 1928.

1,661,743

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

MOTION-PICTURE PROJECTOR.

Application filed February 20, 1925. Serial No. 10,508.

This invention relates to motion picture apparatus and more particularly to improvements particularly applicable to a projector of the type shown in the application of John G. Capstaff, Serial No. 10,601, filed Feb. 20, 1925.

My invention relates especially to the portions of a projector involved in the proper movement of the film and its proper location at the projection window, that is, to the pulldown, gate and framing mechanism, which cooperate to secure a steady projected picture.

Fig. 1 is a side elevation of a portion of a projector showing particularly the mechanisms associated with the gate.

Fig. 2 is a fragmentary section on line 2—2 of Fig. 1.

Fig. 3 is a perspective view of the arm carrying the pulldown claws.

Fig. 4 is a section showing the mounting for the presser member and the objective support.

Fig. 5 is a front view, partly in section, of the same members.

Fig. 6 is a perspective view of the presser member alone with its support.

Fig. 7 is a perspective view of the objective amount alone with certain supporting members.

Fig. 8 is a section on line 8—8 of Fig. 1.

Fig. 9 is a front fragmentary view of the projection window.

Fig. 10 is a fragmentary view from the rear of the guide for the latch of the objective mount.

Upon a base 1 is carried a longitudinal frame or partition 2, in the rear of which are mounted mechanisms and a lamp house not constituting a part of the present invention and not shown here. A cylindrical casing 3 with a cover 4 is mounted on the front of the partition. Centrally of this casing is journaled a shaft 5 carrying a gear 6 intermeshing with a second gear 7 of half its diameter, carried on shaft 8, also journaled in the partition. One end of an arm 10 is pivoted at 9 to the gear disc 6 eccentrically thereof. At the other end of this arm are claws 10' for engagement with the film, and intermediate of its length are lugs 11 through which passes a pin 12 on which is pivoted one end of link 13 the other end of which is pivoted at 14 to gear disc 7 eccentrically thereof.

When these gears are driven the claws will follow the path indicated in dotted lines in Fig. 1, and will pass through slots 15 in the cylindrical casing and slots 16 in the bowed presser member 17.

The film F is continuously fed by sprocket 18, against which it is held by presser members 19 to and from a loop encircling the cylindrical casing 3 and passing between the casing and the presser member 17 where it is fed intermittently by the claws 10' past the registering windows 23 in the casing wall 24 and the presser member. Light from the lamp housing, not shown, enters through an aperture 20 in the partition 2 and, after reflection by a mirror, not shown, illuminates the film at the windows, the illuminated image being projected by an objective 21 in the amount 54 upon a suitable screen. It is to be understood that the film is fed to and from the usual reels, not shown.

The presser member 17 has at its upper end ears 25 with slots 26. A bolt 27 passes through wall 2 and is secured by a nut 28. Rotatably mounted on this bolt is a member having a round head 30, a round concentric portion 31, a round eccentric portion or cam 32 and a second larger eccentric portion or cam 33. The eccentric portion 32 passes through the slots 26.

The objective tube 22 is carried by a support 34 having side flanges 35 and 36 at the upper ends of which are vertical slots 37 and 38, the slot 37 engaging over the concentric portion 31 and the slot 38, which is narrower than 37, engaging over the bolt 27. On flange 36 are two lugs 39 between which fits the eccentric 33.

It will be evident that rotation of the head 30 will adjust vertically the presser member 17 by action of the cam 32 on slots 26, and the support 34 by action of the cam 33 on lugs 39. Springs 40 are coiled about the portion 32 and are attached at the ends 41 to the support 34 and bear at their other ends 42 against the middle portion of the member 17.

If the were no freedom of movement for the upper end of presser member 17 it would not fit the wall of the casing when adjusted. But the slots 26 permit the upper end to move in and out under the resilient pressure of the springs so that, as the presser is adjusted, it will follow the cylindrical wall and fit it smoothly.

The support 34, however, must be guided in a strictly vertical direction so as not to affect the focus of the objective and this is attained because the lugs 39 engage the cam 33 only at top and bottom and the slots 37 and 38 guide the movement. The lower end of support 34 is normally held in position by pin 43 carried thereby. This pin passes with a loose fit through hole 44 in flange 37 and through a vertical slot 45 in flange 36. It is normally pressed toward flange 37 by spring 46. The enlarged head 47 cannot pass through slot 45. When the support 34 is swung about its supporting bolt the pin slides in slot 48 in wall 2 and when in normal position head 47 engages in a countersunk portion 49 shown in Fig. 5 and 10.

The pin is pushed back to disengage the head from the cavity 49 when the support 34 may be swung open. When support 34 is adjusted vertically, the head and countersink act as a ball and socket joint, there being enough play between the pin and hole 44 for the slight necessary angular adjustment of the pin at the point, and the pin has the necessary play in slot 45.

It is understood that the purpose of this vertical adjustment is to permit framing adjustment of the window 24, without affecting the pulldown mechanism or the optical system. The slight vertical movement of the window and objective together is not visible on the screen except as it affects the framing.

When it is necessary or desirable to inspect or clean the inner guiding surfaces where the film passes between the presser 17 and casing 3, the support 34 is unlatched and swung up around the bolt 27, carrying the springs with it and permitting the presser member to be swung out.

The bolt 27 and nut 28 are so adjusted that the friction between the shouldered head 50 of the nut and corresponding seat 51 in the head 30, and the friction between cam 33, flange 36 and wall 2 are sufficient to hold the parts in adjusted position but not enough to render adjustment difficult.

The objective tube 22 has a resilient tongue 50' with a protuberance 51' engaging a helical groove 52 in the objective mount 54 whereby the latter may be adjusted by turning the knurled end 53. By reason of the resilient engagement, the mount may be thrust directly in or out and the protuberance will snap past the grooves 52 without its being necessary to screw the mount all the way in or out. This is done only in inserting or removing the mount.

It is to be understood that many details and usual structural parts have been omitted as unnecessary to an understanding of the invention, and that there are shown only such elements as seem desirable or necessary for a complete disclosure of the invention. This embodiment is by way of example and I contemplate as within the scope of my invention all such modifications and equivalents as are properly covered by the appended claims.

Having thus described my invention, what I claim as new and desire to secure by Letters Patent is:

1. In motion picture apparatus, a frame, an exposure gate comprisng a guide and a presser member between which film may be drawn, an objective support, a common support upon which both said presser member and objective support are separately pivotally supported and means for adjusting said pivotal support longitudinally of the gate.

2. In motion picture apparatus, a wall, an exposure gate comprising a guide extending from said wall and a presser member, an objective support, a member extending from said wall, said presser member and support being separately pivotally supported by said member, and means for adjusting the presser member and support with respect to said second member and longitudinally of the gate.

3. In motion picture apparatus, an exposure gate comprising correspondingly longitudinally bowed guide and presser members, the presser member being resiliently pressed toward said guide member, means for adjusting said presser member longitudinally of said guide and permitting it to follow the curvature thereof when so adjusted.

4. In motion picture apparatus, a supporting frame, an exposure gate comprising longitudinally bowed guide and a correspondingly bowed presser member, the guide being fixed on said frame, a support extending from the frame and comprising an adjustable part, the presser member having a slot engaged by said part by which it is pivotally supported therefrom and whereby it has movement toward and from said guide, and means for resiliently pressing said presser member toward said guide.

5. In motion picture apparatus, an exposure gate comprising longitudinally bowed guide and presser plates having windows, the presser member being resiliently pressed toward said guide members, an objective support in alignment with said windows, and means for adjusting said presser plate and said objective support longitudinally of the gate, the presser member having freedom of movement to follow the curvature of the guide member during such longitudinal adjustment.

6. In motion picture apparatus, an exposure gate comprising longitudinally bowed guide and presser plates having windows, the presser member being resiliently pressed toward said guide members, an objective support in alignment with said windows, and means for adjusting said presser plate and said objective support longitudinally of the gate, the presser member having freedom of movement to follow the curvature of the guide member and the objective support being limited to a movement perpendicular to its axis.

7. In motion picture apparatus, a supporting frame, an exposure gate comprising a longitudinally bowed guide member and a correspondingly bowed presser member, said members having registering windows, an objective support in alignment with said windows, and means carried by said frame for supporting said presser member and said objective support and including separate cams for adjusting them longitudinally of the gate, the presser member having freedom of movement to follow the curvature of the guide member.

8. In motion picture apparatus, a supporting frame, an exposure gate comprising a longitudinally bowed guide member and a correspondingly bowed presser member, said members having registering windows, an objective support in alignment with said windows, and means carried by said frame for supporting said presser member and said objective support and including cams for adjusting them longitudinally of the gate, the presser member having freedom of movement to follow the curvature of the guide member, and means to guide the objective support, when adjusted, in a direction perpendicular to its axis.

9. In motion picture apparatus, an exposure gate comprising a guide and a presser member between which film may be drawn, said presser member being movable with respect to said guide, a movable objective support having an operative position with respect to said gate, and a spring between said support and said presser member and adapted to be tensioned when said support is in operative position to exert a resilient pressure on said presser member and to be relaxed when said support is removed from operative position.

10. In motion picture apparatus, an exposure gate comprising a guide and a presser member between which film may be drawn, said presser member being movable with respect to said guide, a movable objective support having an operative position with respect to said gate, and a spring between said support and said presser member and adapted to be tensioned when said support is in operative position to exert a resilient pressure on said presser member and to be relaxed when said support is removed from operative position and means for adjusting said presser member and said support longitudinally of the gate.

11. In motion picture apparatus, a frame, an exposure gate comprising a film guide carried by said frame, and a presser member pivotally carried by said frame and adapted to be swung toward and from said guide, an objective support pivotally carried by said frame and having an operative position with respect to said gate, means for holding the support in said operative position, and a spring between said support and said presser member and adapted to be tensioned when said support is in operative position to exert a resilient pressure on said presser member and to be relaxed when said support is removed from operative position.

12. In motion picture apparatus, a frame, an exposure gate comprising a film guide carried by said frame and a presser member pivotally carried by said frame and adapted to be swung toward and from said guide, an objective support pivotally carried by said frame and having an operative position with respect to said gate, means for holding the support in said operative position, and a spring between said support and said presser member and adapted to be tensioned when said support is in operative position to exert a resilient pressure on said presser member and to be relaxed when said support is removed from operative position and means for adjusting said presser member and said support longitudinally of the gate.

Signed at Rochester, New York, this 16th day of February, 1925.

OTTO WITTEL.